United States Patent [19]

Clermont et al.

[11] 4,343,681

[45] Aug. 10, 1982

[54] CORE ENERGY PLANT WITH CLOSED WORKING GAS CIRCUIT

[75] Inventors: Heinrich Clermont, Jülich; Siegfried Förster, Alsdorf; Jürgen Heil, Bensberg; Peter Quell, Haaren; Jasbir Singh, Jülich; Berthold Sack; Bruno Schröder, both of Aachen, all of Fed. Rep. of Germany

[73] Assignee: Kernforschungsanlage Jülich Gesellschaft mit beschränkter Haftung, Jülich, Fed. Rep. of Germany

[21] Appl. No.: 54,608

[22] Filed: Jul. 3, 1979

Related U.S. Application Data

[63] Continuation of Ser. No. 769,793, Feb. 17, 1977, abandoned, which is a continuation-in-part of Ser. No. 598,345, Jul. 23, 1975, abandoned.

[51] Int. Cl.³ .............................................. G21C 3/56
[52] U.S. Cl. .................................... 376/293; 376/391
[58] Field of Search ................. 176/38, 60, 65, 87

[56] References Cited

U.S. PATENT DOCUMENTS

| | | | |
|---|---|---|---|
| 3,656,566 | 4/1972 | Coast et al. | 176/60 |
| 3,929,188 | 12/1975 | Brinkman et al. | 176/60 |
| 3,998,057 | 12/1976 | Haferkamp et al. | 176/60 |
| 4,022,659 | 5/1977 | Baumgaertner | 176/60 |
| 4,025,387 | 5/1977 | Haferkamp et al. | 176/60 |
| 4,050,984 | 9/1977 | Arndt et al. | 176/60 |
| 4,120,750 | 10/1978 | Forster et al. | 176/60 |

*Primary Examiner*—Sal Cangialosi
*Attorney, Agent, or Firm*—Becker & Becker, Inc.

[57] ABSTRACT

A core energy plant with closed working gas circuit, in which within an outer safety container there are arranged a reactor core of pre-stressed concrete for heating the working gas, a working gas driven turbo-set with generator, and other components of the working gas circuit such as heat exchanger and gas storage means. The reactor core is separated from the turbo-set and other components and is arranged in a separate reactor chamber with walls of pre-stressed concrete, while the other components are respectively arranged in separate chambers, within an inner concrete container which has chambers for receiving the turbo-set with generator and the remaining components of the working gas circuit and which has its outer wall arranged adjacent the vertical inner wall of the outer safety container there is provided a recess for a pre-stressed concrete container for receiving the reactor core.

6 Claims, 3 Drawing Figures

CORE ENERGY PLANT WITH CLOSED WORKING GAS CIRCUIT

This is a continuation of application Ser. No. 769,793—Clermont et al., filed Feb. 17, 1977, now abandoned, which is a continuation-in-part of now abandoned parent application Ser. No. 598,345—Clermont et al., filed July 23, 1975, all belonging to the assignee of the present invention.

The present invention relates to a core energy plant with closed working gas circuit, in which within an outer safety container there are provided a reactor core heating the working gas, a turbo-set with generator driven by the working gas, and other components of a unitary machine system or the working gas circuit such as heat transferring means and gas storage means, while the reactor core is separated from the turbo-set and the remaining components and is located in a separate reactor chamber with walls made of pre-stressed concrete, individual chambers being provided for said components.

With core energy plants it is required that the machines and devices of the plant such as a turbo-set and other components of the working gas circuit passed through by the working gas are to be arranged in radiation-safe chambers in order to prevent endangering the operating personnel by radioactive radiation. It is necessary to take safety steps also in case that at a possible break of the working gas conduits, the chambers in which the components of the working gas circuit are mounted will be able to withstand the then occurring excessive gas pressure within the chambers and the reactor turn-off device as well as the post heat withdrawing system will not be endangered. In addition thereto, there exists the endeavor to mount the machines and devices in chambers which are easily accessible from the outside in order to permit a removal of the machines and devices, without difficulties and to permit the carrying out of necessary repairs of the components of the core energy plant in areas which are not directly located in the radiation range of adjacent machines and devices.

It is known, to mount the turbo-set and heat transferring machines in a separate chamber below the reactor chamber while the reactor chamber as well as the machine chamber have walls of pre-stressed concrete. With this heretofore known core energy plant, the working gas is through gas conduits passing through the partitions between the reactor chamber and the machine chamber conveyed from the reactor chamber to the turbo-set and from the heat transferring means back into an annular chamber surrounding the reactor core. Such a plant can be realized only with a considerable technical equipment and high expenses. An additional drawback consists in that the components of the core energy plant are accessible only under difficulties.

It has furthermore become known to mount a plurality of turbo-sets and the pertaining heat transferring means in individual chambers separate from the reactor chamber. The chambers within the stressed concrete container surrounding the reactor core are radially distributed about the axis of the reactor core. For purposes of reducing the required volume of the pre-stressed concrete container required with this arrangement, it has been suggested while axis parallelly arranging the heat transferring means to arrange the turbo-set below the chamber for the reactor core in a separate chamber so that it can be removed in a horizontal position. While also in this way the dimensions of the pre-stressed concrete container can be reduced, with such a construction, a relatively large chamber surrounded by pre-stressed concrete remains that greatly influence the costs when building the plant. Moreover, with core energy plants of this type it is disadvantageous that while the turbo-set is arranged within the pre-stressed concrete container, the generator which is connected to the turbo-set is located outside the pre-stressed concrete container so that it is necessary to pass the shaft through the wall of the pre-stressed concrete container. The passage of a shaft which meets all safety regulations for core energy plants can be realized only with a number of technical devices and at high expenses. Moreover, it is disadvantageous that the generator arranged outside the pre-stressed concrete container requires a separate support.

It is, therefore, an object of the present invention to provide a core energy plant which operates with a closed working gas circuit, in which in addition to good accessibility to the components of the core energy plant, safety to an increased extent is assured in case that a break occurs in the gas conduits, while nevertheless a decrease in costs involved in building the plant will be realized.

These objects and other objects and advantages of the invention will appear more clearly from the following specification in connection with the accompanying drawings, in which.

Figure 1:
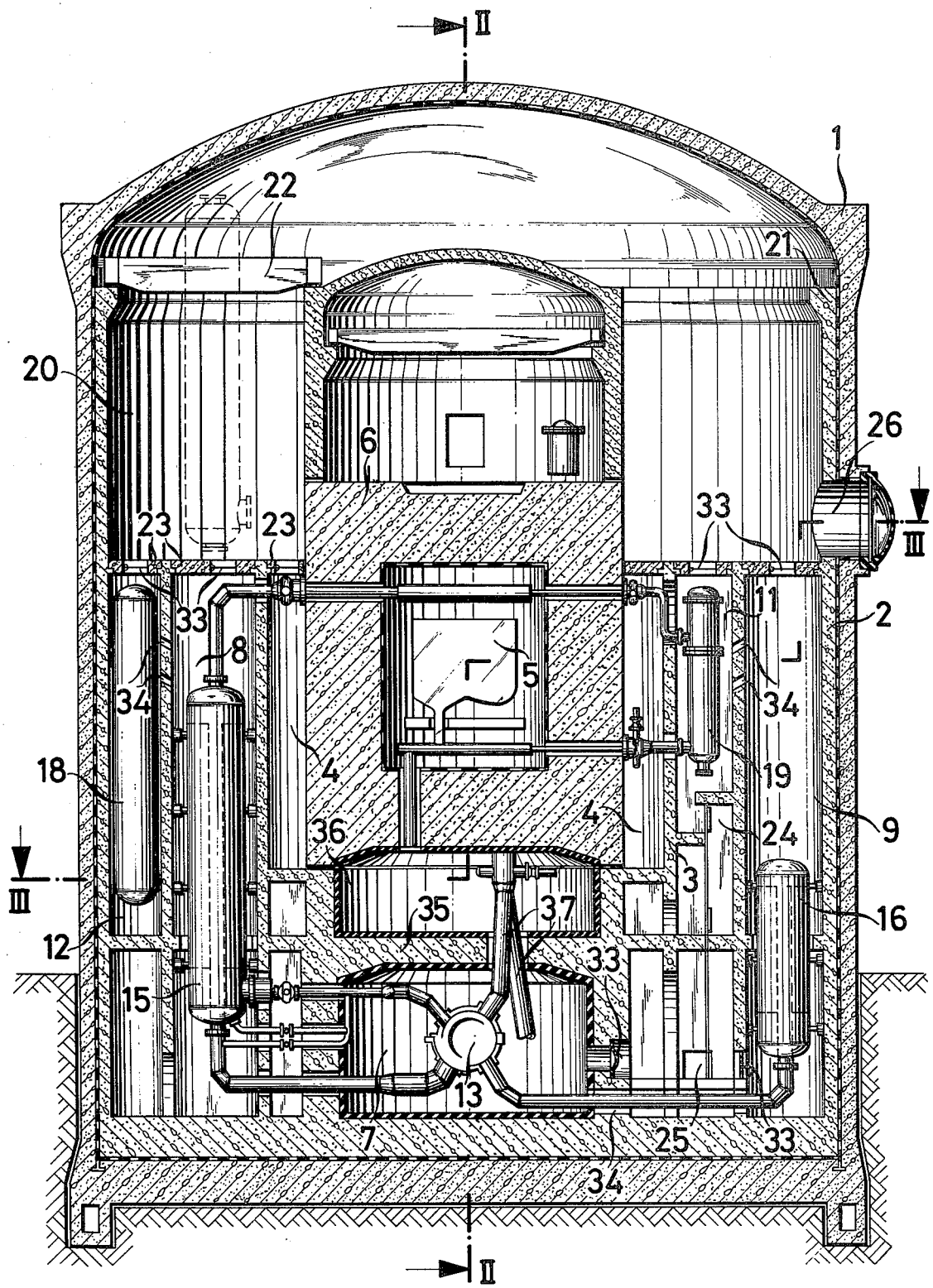
FIG. 1 illustrates a longitudinal section through a core energy plant according to the invention.
Figure 2:
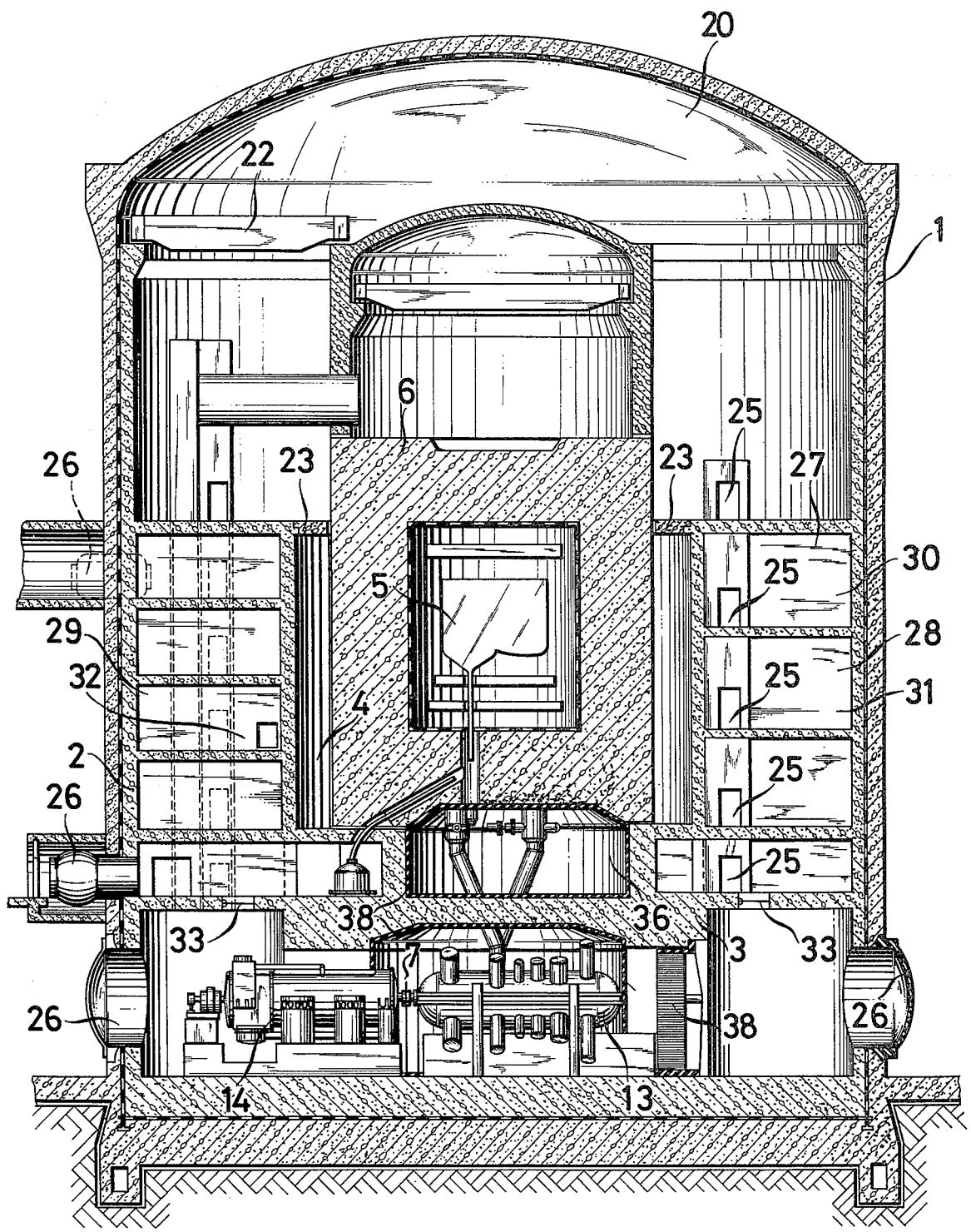
FIG. 2 represents a longitudinal section through the core energy plant according to the invention, said section being taken along the line II—II of FIG. 1.
Figure 3:
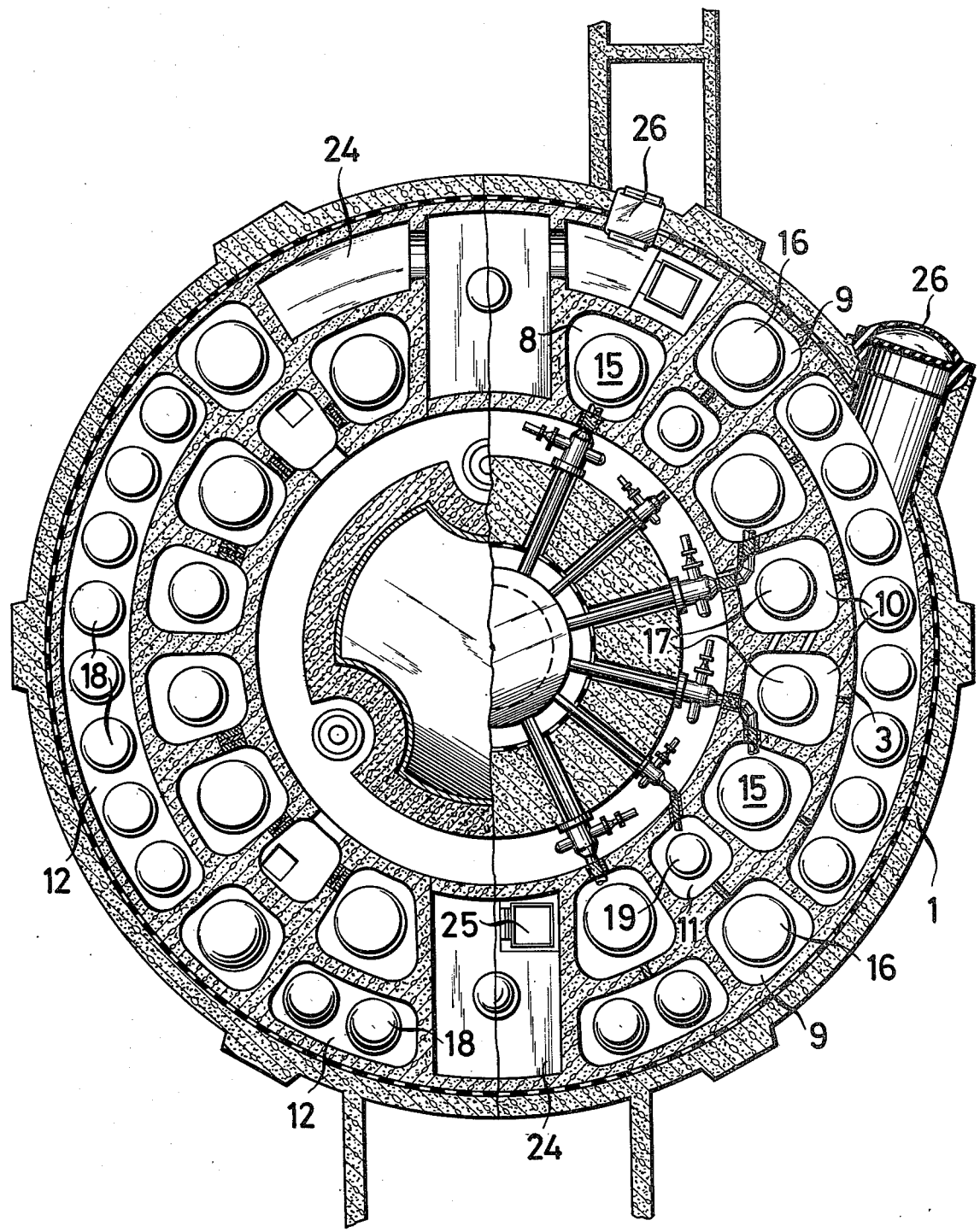
FIG. 3 is a cross section through the core energy plant of FIG. 1, said section being taken along the line III—III of FIG. 1.

The core energy plant according to the present invention is characterized primarily in that within a concrete container there is provided a recess for a pre-stressed concrete container intended for receiving the reactor core 5. Said concrete container has its outer wall border the vertical inside of the outer safety container, and the concrete container comprises chambers which are intended for receiving the turbo-set with generator and the remaining components of the working gas circuit, such as heat exchanging means and gas storage means.

The advantage of this core energy plant consists in that all components of the plant which through gas conduits communicate with the reactor core are mounted in chambers of a separate concrete container and therefore are spatially well accessible. The chamber walls serve as splinter protection in case of breaking machine elements or gas conveying conduits and also serve as screen against radioactive radiation. The concrete container can be manufactured as simple construction while employing inexpensive structural materials. At the same time, the chambers serving for receiving the components form a structural unit which is closed in itself and is earthquake-proof. It is furthermore advantageous in this connection that the generator driven by the turbo-set is mounted within the concrete container.

According to a further development of the invention it is provided that the chambers have openings with gas-tight closures secured against the escape of radioactive substances, for the installation and removal of components arranged in the chambers. In this way it will be assured that damaged components may easily be removed for purposes of carrying out repair jobs.

For purposes of increasing the safety of the core energy plant, the invention provides that the chambers have openings with gas-tight closures preventing the escape of radioactive substances, for installing and removing the components arranged in said chambers. In this way, it will be assured that damaged components can easily be removed for purposes of carrying out repair jobs.

In order to increase the safety of the core energy plant, the invention according to a further development thereof provides that the concrete container comprises separate chambers for the turbo-set with generator and individual or grouped-together heat transferring means for the gas storage means, venting installations with active gas purification and a control device while the chambers are equipped with safety closures preventing excessive gas pressure. When each individual component of the core energy plant is arranged in a separate chamber, it will be appreciated that when one of the devices of the working gas circuit or a conduit breaks, the components in the adjacent chambers and in particular the units of the plant required for safety reasons will be protected against damage. Expediently, the partitions between the chambers comprise overflow openings so that a sufficiently large chamber will be available for receiving the hot working gases which escape in case of breakage, and that the chamber walls will not be unduly stressed. An overheating of the partitions will be prevented preferably by the fact that the chambers are all or in part equipped with a heat-reducing insulation.

Referring now to the drawings in detail, the core energy plant comprises an outer safety container 1 made out of pre-stressed concrete, and a concrete container 3 having its outer wall 2 bordering the vertical inner side of the safety container 1. The concrete container 3 has a recess for an inner pre-stressed concrete container 6 intended for receiving the reactor core 5. Within the concrete container 3 there are provided individual chambers 7-12 for receiving the horizontally arranged turbo-set 13 with generator 14 as well as for the remaining components of the working gas circuit as for instance recuperative heat transferring means 15, precooler 16, intermediate cooler 17, gas storage means 18 and post-heat discharging system 19. In an expedient manner, each individual chamber is adapted or designed in conformity with the component to be received therein and is constructed in conformity with definite safety requirements so that from an economical standpoint optimum shaping will be possible. The wall thickness and the construction of the walls correspond to the forces which are to be conveyed to the walls or become effective and furthermore correspond to the necessary radiological screening function as well as to the function of the walls as splinter protection in case one of the components in the chambers bursts.

Above the concrete container 3, the energy plant has an assembly chamber 20 which is accessible from the outside. The assembly container 20 is expediently confined laterally by a wall 21 which extends from the outer wall 2 of the concrete container 3 in upward direction. The wall 21 similar to the outer wall 2 of the concrete container 3 borders the inner side of the outer safety container 1. The wall 21 on one hand serves as structural support for the path of a crane 22 which is movable above the chambers intended for receiving the components, and on the other hand serves as assembly aid when setting up the outer safety container which has its inner side provided with a liner. With this design, additionally an improvement in the earthquake safety of the core energy plant is realized.

For purposes of installing and removing the components arranged in the chambers 7-12, the chambers are provided with openings having closures 23 which are gas-tight for preventing the escape of radioactive rays. With the chambers 8-12, which extend in vertical direction and are intended for the heat exchangers or transmitters, the closures 23 are arranged in the confining wall of the concrete container 3 toward the assembly chamber 20. After loosening the closures 23 and after loosening the pipe connections on the heat transmitter to be removed, the heat transmitter, as diagrammatically illustrated in FIG. 1 for the recuperative heat transmitter 15 can be lifted into the assembly chamber 20 and from here can be removed out of the core energy plant. The chambers 7-12 in which the machines and devices conveying working gas are mounted are in view of the radioactive radiation of the machines and devices in view of the working gas passed through the devices not accessible, or accessible only with a limited stay. In an expedient manner, therefore, in the concrete container adjacent to the chambers 7-12 there are provided chambers 24 which are accessible and which are in communication with each other. The chambers 24 are vented and are accessible through inlets 25, as the case may be by using gates 26 inserted in the walls of the safety container 1. The accessible chambers 24 communicate with chambers 27-29 for the venting plant 30 with active gas purification, for the control device 31 and for other measuring devices 32. Between the accessible chambers 24 and the chambers 7-12, as well as chambers 27 to 29, there are provided safety closures 33. These closures 33 will open in response to an undue high gas overpressure in one of the chambers so that the hot working gases which escape in case of a breakage can be withdrawn without overstressing the chamber walls. Within the chambers 7-12, a flow-over of the escaping working gases into adjacent chambers is possible, also through overflow openings 34 through which also gas conveying conduits extend or which serve for receiving pipe connections and shut-off valves.

In an expedient manner, in the concrete container 3 above the chamber 7 in which the turbo-set 13 with generator 14 is installed, there is arranged an instrument chamber 36 which is protected by a spindle protecting ceiling 35 which closes the chamber 7 toward the top. The hot gas conduits 37 which extend from the reactor core 5 to the turbo-set 13 are passed through the splinter protective ceiling 35.

The pre-stressed concrete container 6 which receives the reactor core 5 forms a unit which is built up separately from the remaining constructions of the core energy plant. For servicing or inspecting the pre-stressed concrete container 6 as for instance the post-tightening of clamping cables or the control of measuring instruments for checking the reactions, there is provided a chamber within the recess 4, which chamber remains free between the pre-stressed concrete container 6 and the concrete container 3.

In the embodiment shown in the drawings, heat reducing installations 38 are provided on the walls of the chamber 7 and in the instrument chamber 36. These insulations will in case of a breakage of one of the hot gas conduits prevent the walls of the concrete container 3 from overheating.

The present invention concerns a nuclear energy system with a closed working-gas circulation with which the working gas heated up in the reactor core becomes supplied directly to the energy generating working machines, the turbines. The working gas flows through the turbines as well as the compressors which together with the turbines as a turbo-set form a unitary machine system or arrangement and also the remaining components of the working gas circulation determined for the heat exchange.

With the production of nuclear energy plants or systems of this type, previously there was used exclusively pre-stressed concrete as a construction material for the accommodation of nuclear reactors, turbo-set and remaining circulation components of the working gas circulation, so that the chambers can then maintain overpressure resulting during an eventual break or interruption of one of the working gas conduits or components. A nuclear energy system of this type for example, becomes described in the U.S. Pat. No. 3,929,188—Brinkmann, et al. issued Dec. 30, 1975. In column 3, lines 60-67 of this patent, there is stated that the reactor core and apparatus of the nuclear energy system are accommodated in chambers with walls of stressed concrete. This corresponds entirely with the state of the art beyond which the teaching of the present invention proceeds. Disadvantageous with these known nuclear energy systems, however, is that the utilization of stressed concrete as a construction material and accommodation of all components of the nuclear energy system represents a considerable cost factor during production of the nuclear energy systems and it is an object of the present invention to alleviate this cost factor.

This object becomes resolved by the present invention thereby that only the reactor core is accommodated or installed in a separate stressed concrete container and that this is installed in a corresponding recess of a steel-concrete container having a boundary or limit on the outer safety container and which provides chambers in which both the turboset with the generator and also the remaining circulation components are accommodated or installed. The average man skilled in the art when considering steel-concrete, understands a concrete, giving satisfactory results by means of steel inserts (reinforcements) which can also take up pulling or tension forces. With stressed concrete, however, the concern involves pre-stressed concrete in relieved or unloaded condition with the aid of stressed steel wire inserts and which provides a tensile strength far exceeding the quality of steel concrete, which, however, is produceable moreover only with considerable higher construction costs.

Nuclear energy systems which correspond generically with the disclosure of the present invention are described only in the already noted U.S. Pat. No. 3,929,188—Brinkmann et al. and in the foreign Dutch disclosure No. 7,103,025—Brown dated September 1971. Both disclosures, however, fail to go beyond the state of the art in any way as already acknowledged in the present disclosure. Moreover, in the same manner as with the nuclear energy system of U.S. Pat. No. 3,929,188—Brinkmann, et al., there are also accommodated or installed the components of the reactor of the Dutch Pat. No. 7,103,025—Brown with a closed working gas circulation without exception being provided in chambers consisting of pre-stressed concrete which in a disadvantageous manner leads to high costs during production of such nuclear energy systems or plants. Both references show further how far there was known to the average man skilled in the art with nuclear energy systems with closed working gas circulation to use exclusively pre-stressed concrete for the construction. Thus there cannot be ascertained the inventive teaching of the present disclosure in referring to the references cited.

With the nuclear energy system or plant described in the foreign British Pat. No. 922,221—Moore et al. dated March 1963, the concern involves a system with a secondary circulation with which the working gas heated up in the reactor core in contrast to the teaching of the present invention, becomes supplied accordingly not directly as to the energy generating working machines (compare British Pat. No. 922,221—Moore et al. on Page 3, lines 4 and 5). The reactor system or plant accordingly does not correspond generically to the present invention and accordingly cannot anticipate or make obvious the features of the present invention. The nuclear energy system known from the foreign British patent is, however, not so made that the features of the present invention would be obvious or self-understood for the average man skilled in the art. The reactor core in contrast to the present invention is accommodated in a steel pressure vessel which additionally is provided with an inner thermal shield. A steel pressure container of this type is primarily disadvantageous because the same is capable of being installed or used only with a precondition that the reactor volume is relatively small as is also the case with a reactor known from the foreign British Pat. No. 922,221—Moore et al. According to the invention there is, however, no steel container provided for the reactor core, but rather a pre-stressed concrete container.

In the references there are described light water reactors which are embodied either as boiling water reactors or pressure water reactors. Such nuclear reactor systems cannot be compared in any manner with the teaching of the present invention as to the constructive conception thereof as known to every average man skilled in the art. This is true already because with the boiling water reactors because of the higher output density compared with gas cooled nuclear reactors are such that the reactor core provides a far smaller volume and for this reason can be installed in steel containers. Not a single chamber is produced of pre-stressed concrete with the light water reactor systems of the known type. These references accordingly cannot contribute in any way toward the solution of the problem as is the object of the present invention.

The reactor core installed in a separate container of pre-stressed concrete is connected to the nuclear energy system.

The crux of the present invention is not solely the installation of the reactor core in a separate container of pre-stressed concrete (as known from the foreign Dutch Pat. No. 7,103,025 of Brown dated September 1971 (Boveri and Cie); with installation of the reactor core in a separate pre-stressed concrete container, there could not be resolved the object of the present invention which is to reduce cost with production of nuclear energy systems with a closed operating gas circulation without influencing the safety of the nuclear energy system in reducing the cost. The solution according to the present invention involves accommodation of all components of the operating gas circulation including the turbo-set with the generator in a corresponding chamber means provided for the components in the concrete container which consists of steel-concrete and in this steel-concrete container to provide a recess for a pre-stressed concrete container which accommodates the reactor core.

The use of steel-concrete and nuclear energy systems of the inventive type cannot be found to be shown or suggested by U.S. Pat. No. 3,929,188—Brinkman et al. dated Dec. 30, 1975 or Brown, Boveri. Pre-stressed concrete is used exclusively as the construction material with these known nuclear energy systems. Pre-stressed concrete is used exclusively as the construction material with the previously known nuclear energy systems; there is to be understood that distinction should be made by the "pre-stressed concrete" for the outer safety container and "steel-concrete" when referring to the container for the reactor core.

An attempt to combine the teaching of Brinkmann and Brown,Boveri does not result in the features of the present invention. Furthermore, the average man skilled in the art or the expert is diverted away from the solution of the object when referring to the cited references. A separate pre-stressed concrete container for the reactor core as disclosed by Brown, Boverie and then placed inside the pre-stressed concrete container of Brinkmann for installation of the circulation components, would increase the costs for the construction of a nuclear energy plant even more rather than to lower the costs as is the object of the present invention.

The remaining prior art also lacks the use of steel-concrete container means for the core reactor installed inside the pre-stressed concrete container in accordance with the present invention.

It is, of course, to be understood that the present invention is, by no means, limited to the specific showing in the drawings but also comprises any modifications within the scope of the appended claims.

What we claim is:

1. A nuclear energy plant having a closed working gas circuit with which the working gas heated up in a reactor core becomes supplied directly to energy generating working turbine machines in which the working gas flows through the turbines as well as the compressors that together with the turbines as a turbo-set form a unitary machine system, which includes the improvement in combination therewith comprising: an outer safety container consisting of prestressed concrete for heating the working gas, and an inner container particularly of economical unprestressed steel concrete and said inner container having an outer cylindrical wall adjacent said outer container and an inner cylindrical wall forming a central recess in which a separate container only of prestressed concrete with a nuclear reactor core is received and supported, said inner container comprising a chamber below said recess housing a working gas driven turbo-set and a plurality of accessible chambers formed by radial walls between said outer and inner cylindrical walls communicating with each other to allow flow of gases between said chambers and surrounding the recess on all sides above the chamber housing the turbo-set in which are located components of the working gas circuit, including heat exchangers, post heat discharge systems, pre-coolers and gas storage means, heat transferring means, intermediate coolers, and other components, and a horizontal wall closing the tops of said accessible chambers, said wall forming the bottom of an assembly chamber above said accessible chambers and said recess, said horizontal wall having gas-tight closures in said accessible chambers, said closures being movable to allow access to said accessible chambers and removal of components in said chambers to said assembly chamber and out of said outer safety container.

2. A nuclear energy plant in combination according to claim 1, in which said assembly chamber has a crane device therein movable around said chamber to enable removal of a component from any selected accessible chamber.

3. An energy plant in combination according to claim 1, in which at least some of said individual chambers thereof are of such capacity as to be able to receive groups of at least some of said other components.

4. An energy plant in combination according to claim 1, in which said individual chambers are separated from each other by partitions provided with overflow openings.

5. An energy plant in combination according to claim 1, in which at least some of said individual chambers are provided with heat insulating means.

6. A nuclear energy plant having a closed working gas circuit with which the working gas heated up in a reactor core becomes supplied directly to energy generating working turbine machines in which the working gas flows through the turbines as well as the compressors that together with the turbines as a turbo-set form a unitary machine system, in combination comprising an outer safety container enclosing the plant and consisting of prestressed concrete walls, a separate reactor container of pre-stressed concrete with only a nuclear reactor core centrally located therein, an inner, intermediate container structure within said outer safety container and surrounding said separate reactor container, said inner, intermediate container structure comprising a chamber below said separate reactor container housing a working gas driven turbo-set and a plurality of accessible chambers surrounding said separate reactor container and located between said reactor container and the walls of said outer safety container, said plurality of chambers containing components of the working gas circuit and being in communication with each other to allow flow of gases between said chambers, said inner, intermediate container having a horizontal wall closing the tops of said accessible chambers, said wall forming the bottom of an assembly chamber with said outer container above said accessible chambers and said reactor container, said horizontal wall having gas-tight closeness in said accessible chambers, said closures being movable to allow access to said accessible chambers and removal of components in said chambers to said assembly chamber.

* * * * *